US012322954B2

(12) United States Patent
Klimczak et al.

(10) Patent No.: US 12,322,954 B2
(45) Date of Patent: Jun. 3, 2025

(54) HV SWITCH UNIT, PULSING ASSEMBLY AND METHOD OF AVOIDING VOLTAGE IMBALANCES IN AN HV SWITCH

(71) Applicant: TRUMPF Huettinger Sp. z o. o., Zielonka (PL)

(72) Inventors: Andrzej Klimczak, Warsaw (PL); Andrzej Gieraltowski, Warsaw (PL); Michal Balcerak, Marki (PL)

(73) Assignee: TRUMPF HUETTINGER SP. Z O. O., Zielonka (PL)

( * ) Notice: Subject to any disclaimer, the term of this patent is extended or adjusted under 35 U.S.C. 154(b) by 212 days.

(21) Appl. No.: 18/159,100

(22) Filed: Jan. 25, 2023

(65) Prior Publication Data

US 2023/0170687 A1    Jun. 1, 2023

Related U.S. Application Data

(63) Continuation of application No. PCT/EP2021/070861, filed on Jul. 26, 2021.

(30) Foreign Application Priority Data

Jul. 27, 2020 (EP) .................... 20461553

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC .......... H02H 9/04; H02H 1/00; H02H 1/0007; H02M 1/0058; H02M 1/088; H02M 1/32; H02M 1/34

(Continued)

(56) References Cited

U.S. PATENT DOCUMENTS 4,276,588 A * 6/1981 McLyman ............ H02H 7/1213
                                                363/56.08
4,555,754 A    11/1985 Hennevin
(Continued)

FOREIGN PATENT DOCUMENTS

CN    101834517 A    9/2010
CN    101860214 A    10/2010
(Continued)

OTHER PUBLICATIONS

L.M. Redondo et al., "All Silicon Marx-bank Topology for High-voltage, High- frequency Rectangular Pulses," Annual IEEE Conference on Power Electronics Specialists (PESC), Jun. 2005, pp. 1170-1174, IEEE, Dresden, Germany.
(Continued)

*Primary Examiner* — Danny Nguyen
(74) *Attorney, Agent, or Firm* — LEYDIG, VOIT & MAYER, LTD.

(57) ABSTRACT

A high voltage (HV) switch unit includes a plurality of semiconductor switches connected with each other in series and configured to switch on and off simultaneously, and a plurality of series circuits. Each series circuit includes a snubber energy storage component and a snubber rectifying component. Each series circuit is connected parallel to each respective semiconductor switch. The HV switch unit further includes a voltage balancing circuit comprising a plurality of balancing electronic components in combination with a voltage limiting electronic component. The plurality of balancing electronic components forms a chain parallel to the serially connected semiconductor switches. The chain is configured to transport electrical charge from one snubber energy storage component to the next only in one direction. The voltage limiting electronic component is configured to (Continued)

limit a voltage at an end of the chain, where the electrical charge is transported to.

14 Claims, 3 Drawing Sheets

(58) Field of Classification Search
USPC .............................................. 361/91.7, 91.8
See application file for complete search history.

(56) References Cited

U.S. PATENT DOCUMENTS

| | | | |
|---|---|---|---|
| 4,670,667 | A | 6/1987 | Petit |
| 5,286,360 | A | 2/1994 | Szczyrbowski et al. |
| 5,969,964 | A | 10/1999 | Mangtani |
| 6,096,174 | A | 8/2000 | Teschner et al. |
| 6,488,807 | B1 | 12/2002 | Toshima et al. |
| 6,859,087 | B2 | 2/2005 | Galli et al. |
| 6,963,498 | B2 | 11/2005 | Nadd |
| 8,536,929 | B2 | 9/2013 | Bergmann |
| 8,962,488 | B2 | 2/2015 | Liao et al. |
| 10,347,500 | B1 | 7/2019 | Doh et al. |
| 2001/0017783 | A1 | 8/2001 | Bruckmann et al. |
| 2002/0004309 | A1 | 1/2002 | Collins et al. |
| 2004/0055881 | A1 | 3/2004 | Christie |
| 2004/0257845 | A1* | 12/2004 | Wu ..................... H03K 17/107 363/132 |
| 2010/0248488 | A1 | 9/2010 | Agarwal et al. |
| 2012/0038677 | A1 | 2/2012 | Hiroi et al. |
| 2015/0002977 | A1* | 1/2015 | Dupraz ................. H01H 9/542 361/115 |
| 2015/0268486 | A1 | 9/2015 | Edler |
| 2016/0043546 | A1 | 2/2016 | Lendi |
| 2016/0203958 | A1 | 7/2016 | Arase et al. |
| 2018/0358213 | A1 | 12/2018 | Ruzic et al. |
| 2019/0088521 | A1 | 3/2019 | Chua et al. |
| 2019/0088522 | A1 | 3/2019 | Lindley et al. |
| 2019/0198298 | A1 | 6/2019 | Hirose et al. |
| 2020/0051786 | A1* | 2/2020 | Ziemba ............ H03K 17/08148 |

FOREIGN PATENT DOCUMENTS

| | | |
|---|---|---|
| CN | 203504399 U | 3/2014 |
| CN | 105356779 A | 2/2016 |
| CN | 105406722 B | 10/2018 |
| DE | 19651811 A1 | 6/1998 |
| DE | 102012222606 A1 | 6/2014 |
| DE | 102013212099 A1 | 1/2015 |
| DE | 102016223314 A1 | 5/2018 |
| EP | 0553410 A1 | 8/1993 |
| EP | 2533411 A1 | 12/2012 |
| FR | 2547106 A1 | 12/1984 |
| JP | 06197522 A | 7/1994 |
| JP | 0767320 A | 3/1995 |
| JP | 2003129234 A | 5/2003 |
| JP | 2010116578 A | 5/2010 |
| JP | 2020108326 A | 7/2020 |
| WO | 2005005684 A1 | 1/2005 |
| WO | 2008071732 A2 | 6/2008 |
| WO | 2010116578 A1 | 10/2010 |
| WO | 2016026790 A2 | 2/2016 |
| WO | 2019049158 A1 | 3/2019 |
| WO | 2019212592 A1 | 11/2019 |

OTHER PUBLICATIONS

Ahmed Abbas Elserougi et al; "Conceptual Study of a Bipolar Modular High-Voltage Pulse Generator with Sequential Charging," IEEE Transactions on Dielectrics and Electrical Insulation 23(6), Dec. 2016, pp. 1-8, IEEE, Piscataway, New Jersey, United States.
C. Gerster, "Fast high-power/high-voltage switch using series-connected IGBTs with active gate-controlled voltage-balancing," Proceedings of 1994 IEEE Applied Power Electronics Conference and Exposition—ASPEC'94, Feb. 1994, pp. 469-472, IEEE, Orlando, FL, USA.
D Gahan et al., "Ion energy distribution measurements in rf and pulsed dc plasma discharges," Plasma Sources Science and Technology, Apr. 2012, pp. 1-4, vol. 21, No. 4, IOP Publishing Ltd, Bristol, United Kingdom.
Y. H. Man et al., "Influence of plasma condition on carbon nanotube growth by rf-PECVD," Nano-Micro Letters, 2010, pp. 37-41, Springer Link, Berlin, Germany.
Hiren Canacsinh et al., "Isolated Autonomous Capacitive Power Supplies to Trigger Floating Semiconductors in a Marx Generator," 2007 IEEE International Symposium on Industrial Electronics, Jun. 2007, pp. 1-6, IEEE, Vigo, Spain.
J. Saiz, "Optimisation and integration of an active clamping circuit for IGBT series association," Conference Record of the 2001 IEEE Industry Applications Conference. 36th IAS Annual Meeting (Cat. No.01CH37248), Sep. 2001, pp. 1046-1051, IEEE, Chicago, IL, USA.
Soonwook Hong et al., "Series connection of IGBT's with active voltage balancing," IEEE Transactions on Industry Applications, Aug. 1999, pp. 917-923, vol. 35, Issue 4, IEEE, Piscataway, New Jersey, United States.
Shiqi Ji et al., "Series-connected HV-IGBTs using active voltage control with status feedback circuit," 2014 IEEE Energy Conversion Congress and Exposition (ECCE), Sep. 2014, pp. 710-715, IEE, Pittsburgh, PA, USA.
The Van Nguyen et al., "Series connection of IGBT," 2010 Twenty-Fifth Annual IEEE Applied Power Electronics Conference and Exposition (APEC), Feb. 2010, pp. 2238-2244, IEEE, Palm Springs, CA, USA.
M.A. Huque et al., "Silicon-on-insulator-based high-voltage, high-temperature integrated circuit gate driver for silicon carbide-based power field effect transistors", IET Power Electronics, Nov. 2010, pp. 1001-1009, vol. 3, Issue 6, The Institution of Engineering and Technology, London, England.

* cited by examiner

HV SWITCH UNIT, PULSING ASSEMBLY AND METHOD OF AVOIDING VOLTAGE IMBALANCES IN AN HV SWITCH

CROSS REFERENCE TO RELATED APPLICATIONS

This application is a continuation of International Application No. PCT/EP2021/070861 (WO 2022/023270 A1), filed on Jul. 26, 2021, and claims benefit to European Patent Application No. EP 20461553.8, filed on Jul. 27, 2020. The aforementioned applications are hereby incorporated by reference herein.

FIELD

Embodiments of the present invention relate to an HV switch unit comprising several semiconductor switches connected in series and configured to switch on and off simultaneously.

BACKGROUND

Imperfect driver synchronization, parasitic circuit components as well as small deviations of the properties of the semiconductors, which are connected in series to operate as one HV switch, may cause significant voltage imbalance among the individual semiconductor switches and lead to failure due to overvoltage or thermal overload.

The higher the voltage and/or switching frequency the more significant this problem becomes.

One solution is to place clamp-and-discharge circuits locally on each semiconductor switch. A diode and capacitor can provide fast clamping, and the discharge feature can be achieved by an active voltage limiter.

This solution requires equipping each semiconductor switch with a voltage-limiter circuit (which consists of several components) although only some of these limiters will be used efficiently.

SUMMARY

Embodiments of the present invention provide a high voltage (HV) switch unit. The HV switch unit includes a plurality of semiconductor switches connected with each other in series and configured to switch on and off simultaneously, and a plurality of series circuits. Each series circuit includes a snubber energy storage component and a snubber rectifying component. Each series circuit is connected parallel to each respective semiconductor switch. The HV switch unit further includes a voltage balancing circuit. The voltage valancing circuit includes a plurality of balancing electronic components in combination with a voltage limiting electronic component. Each balancing electronic component is connected between a connection point of the snubber energy storage component and the snubber rectifying component of a respective series circuit associated with a corresponding semiconductor switch. The plurality of balancing electronic components forms a chain parallel to the serially connected semiconductor switches. The chain is configured to transport electrical charge from one snubber energy storage component to the next snubber energy storage component only in one direction. The voltage limiting electronic component is configured to limit a voltage at an end of the chain, where the electrical charge is transported to.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
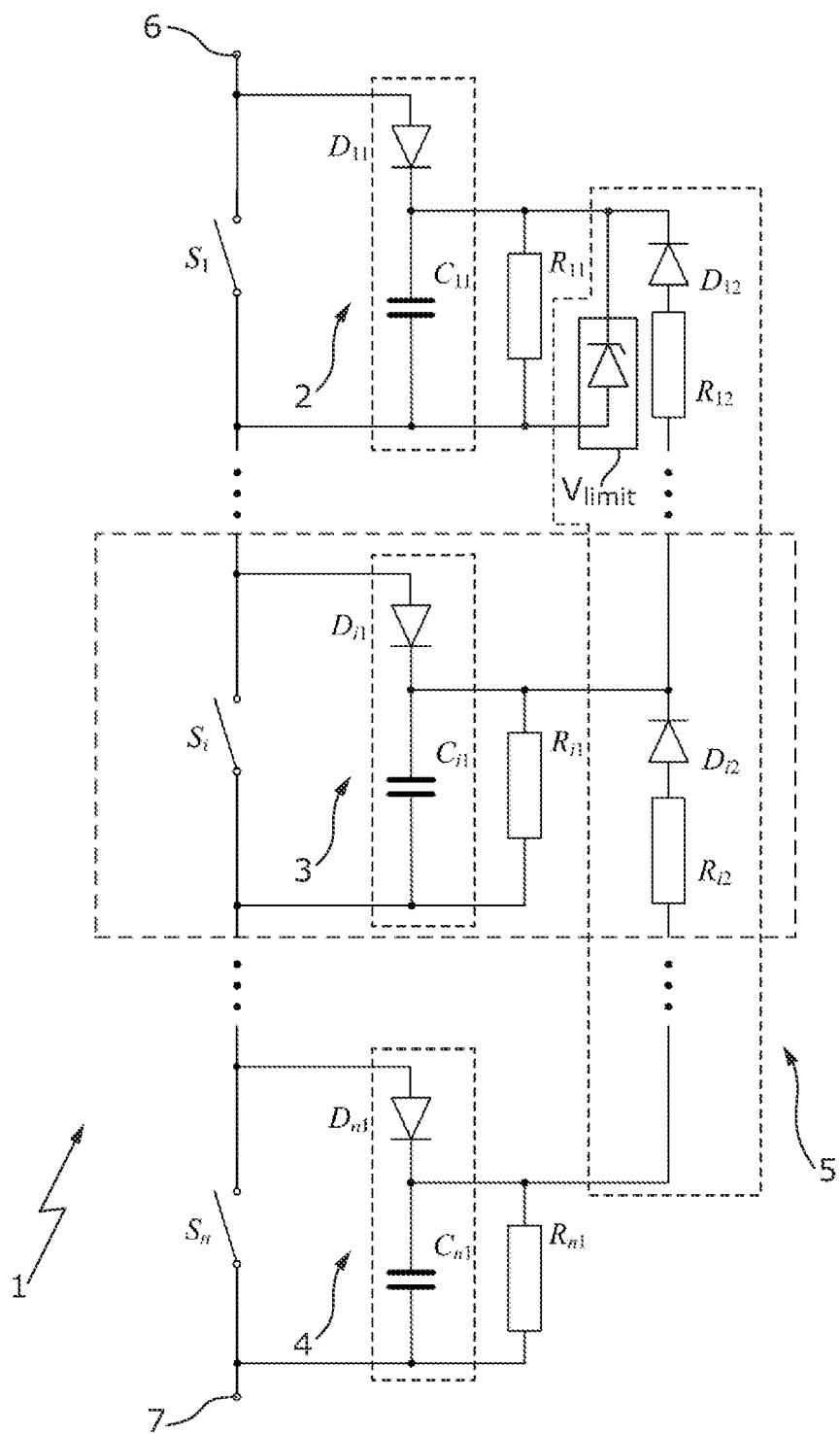
FIG. 1 shows a first embodiment of an HV switch unit transporting charge in a first direction.

Embodiments of the present invention provide an HV switch unit that mitigates voltage imbalances.

According to a first aspect of the invention, an HV switch unit comprises:
a. several semiconductor switches connected in series and configured to switch on and off simultaneously,
b. series circuits of a snubber energy storage component and a snubber rectifying component, wherein a series circuit is connected parallel to each semiconductor switch,
c. a voltage balancing circuit comprising a chain of balancing, in particular rectifying, electronic components, in combination with one voltage limiting electronic component, wherein
  i. the balancing electronic components are connected between the connection points of the snubber energy storage component and the snubber rectifying component of series circuits associated with neighboring semiconductor switches,
  ii. the balancing electronic components form a chain parallel to the series connected semiconductor switches, wherein the chain is configured to transport electrical charge from one snubber energy storage component to the next only in one direction,
  iii. the voltage limiting electronic component is configured to limit the voltage at the end of the chain, where the electrical charge is transported to.

Thus, a chain of balancing electronic components, in particular a diode chain, is used to spread the excessive charge from local energy storage components along the serial switches to an energy storing component at the end of the chain, in particular the top-most or bottom-most energy storage component. Only one voltage limiting component may be required, which may be located at one end of the chain.

Every time the HV switch, i.e. the several semiconductor switches, is turned on the (diode) chain is activated and voltages on the energy storage components are equalized.

Embodiments of the present invention can improve the even voltage distribution among multiple semiconductor switches, which are connected in series to form a HV switch. In particular, differential energy dissipation among all switches is ensured. Embodiments of the present invention can be applied for soft switching devices (no current before switch-off).

A resistor may be connected in parallel to at least one, in particular each, snubber energy storage component. Such a resistor can dissipate power and protect the circuit.

The chain may comprise at least one resistor. Such a resistor improves differential power dissipation.

An input port of the HV switch unit may be configured to be connected to a power source, which may be a DC voltage source. The HV switch may be configured to switch on and off a DC voltage with an absolute value of 500 V or more, in particular 1.000 V or more. Furthermore the HV switch may be configured to switch on or off within a rising time of 1 ms or less.

A second series circuit of a snubber energy storage component and a snubber rectifying component may be connected parallel to each semiconductor switch, and a second voltage balancing circuit comprising a series connection of balancing electronic components in combination with at least one voltage limiting electronic component may be provided, wherein
  a. the balancing electronic components are connected between the connection points of the snubber energy storage component and the snubber rectifying component of the second series circuits associated with neighboring semiconductor switches,
  b. the balancing electronic components form a chain parallel to the HV switch, wherein the chain is configured to transport electrical charge from one snubber energy storage component to the next only in one direction.

Thus, a second chain is provided and each chain can transport electrical charge in another direction. Hence, bidirectional balancing may be realized, improving the balancing performance.

The series circuits associated with the same voltage balancing circuit may have the same order of snubber energy storage and snubber rectifying component. Thus, two chains transporting energy or charge in different directions can be realized. So it is possible to transfer energy in opposite directions.

To every snubber energy storage component of the second series circuits can be connected in parallel an energy consuming or dissipating element, thus improving balancing. Consuming energy may also mean to transfer energy to another circuit.

At least one snubber energy storage component may be a capacitor, in particular all snubber energy storage components may be capacitors. Using capacitors energy storage components can be realized easily and cost-effectively.

At least one snubber rectifying component may be a diode, in particular all the snubber rectifying components may be diodes. The direction of energy or charge transfer can be controlled easily using diodes.

The voltage limiting electronic component may comprise a voltage detection component, in particular a Zener diode or any other circuit that consumes energy when voltage on it is higher than a reference voltage. In particular, an overvoltage may be detected by the voltage detection circuit which then leads to power dissipation in a power transistor which may be triggered by the voltage detection component. As a result, the voltage at the snubber energy storage component at the end of a chain is limited. The voltage limiting electronic component may comprise a recuperation circuit to transfer energy back to a power source.

The first or last switch may be placed on a stable potential and the voltage limiting element may be placed in the vicinity of the switch placed on the stable potential. Such a switch is usually at the end of the chain of transistors which make up the HV switch. A stable potential may be earth or ground e.g. it may be also any potential which is above or below earth or ground and does not change its voltage in respect to earth or ground over a predetermined period.

In a further aspect, embodiments of the present invention provide a pulsing assembly for supplying voltage pulses to a load, in particular a plasma process, the assembly having an input port for connection to a power source and an output port for connection to the load. The pulsing assembly comprises a first HV switch unit according to embodiments of the invention connected between the input port and the output port and/or a second HV switch unit according to embodiments of the invention connected between the output port and a common port, configured to be connected to ground. Such a pulsing assembly can be used to supply a plasma process with energy in the form of voltage pulses, for example for plasma etching or plasma deposition of material on a substrate. However, other fields of use exist for a pulsing assembly according to embodiments of the present invention.

The pulsing assembly may be configured to supply pulses with a voltage corresponding to the DC-voltage at the input port. In particular, the pulsing assembly may be configured to supply pulses with a duration of 1 ms or less.

Embodiments of the present invention also provide a method of avoiding voltage imbalances in an HV switch that includes several semiconductor switches connected in series when the HV switch is turned on. The method comprises the steps of:
  a. Connecting in parallel to each semiconductor switch a series circuit of a snubber energy storage component and a snubber rectifying component,
  b. Spreading the excess charge from the energy storage components by providing a chain of balancing electronic components parallel to the semi-conductor switches,
  c. Limiting the voltage at the beginning or end of the chain by providing a voltage limiting electronic component in parallel to the snubber energy storage component associated with the first or last semiconductor switch of the series connected semiconductor switches.

The excess charge may be spread in one direction only or a second series circuit of a snubber energy storage component and a snubber rectifying component may be provided for each semiconductor switch and a second chain of balancing electronic components may be provided, wherein each chain spreads charge in one direction only.

Two HV switches may be connected in series, the series connection may be connected to a DC source, an output port at the connection point of the HV switches may be connected to a plasma load and the HV switches may be controlled such that a pulsed voltage is supplied to a load, in particular a plasma load.

FIG. 1 shows a first embodiment of an HV switch unit 1. The HV switch unit 1 comprises several semiconductor switches S1, Si, Sn connected in series and configured to switch on and off simultaneously. Parallel to each semiconductor switch S1, Si, Sn is provided a series circuit 2, 3, 4 of a snubber energy storage component C11, Ci1, Cn1, in this case embodied as a capacitor, and a snubber rectifying component D11, Di1, Dn1, in this case embodied as a diode.

A voltage balancing circuit 5 comprises a chain of balancing, in particular rectifying components D12, Di2, in this case embodied as diodes. The voltage balancing circuit 5 further comprises one voltage limiting electronic component Vlimit. The chain of the voltage balancing circuit 5 further may comprise resistors R12, Ri2. The balancing components D12, Di2 and optional resistors R12, Ri2 are connected between the connection points of the snubber energy storage component C11, Ci1, Cn1 and the snubber rectifying component D11, Di1, Dn1 of series circuits 2, 3, 4 associated with neighboring semiconductor switches S1, Si, Sn. In other words, a series arrangement of a balancing component D12, Di2 and a resistor R12, Ri2 connects two neighboring series circuits 2, 3, 4. The series arrangements are themselves connected in series.

The balancing components D12, Di2 are forming a chain parallel to the series connected semiconductor switches S1, Si, Sn, wherein the chain is configured to transport electrical charge from one snubber energy storage component C11, Ci1, Cn1 to the next only in one direction. In the embodiment shown charge is transported from snubber energy storage component Cn1 to snubber energy storage component Ci1 and from snubber energy storage component Ci1 to snubber energy storage component C11.

The voltage limiting electronic component Vlimit is configured to limit the voltage at the end of the chain, where the electrical charge or energy is transported to. To this end the voltage limiting electronic component Vlimit comprises a voltage detection component, in particular a Zener diode, or any other circuit that detects a voltage rising above a reference voltage, and a consumer to consume energy when the voltage detected is higher than the reference voltage. The consumer may be a transistor. The consumer may be a circuit, such as an inverter, feeding energy back into a part of an external circuit or component such as an energy storage component such as a capacitor, e.g.

A resistor R11, Ri1, Rn1 is connected in parallel to each snubber energy storage component C11, Ci1, Cn1.

Ports 6, 7 are provided, at least one of the ports 6, 7 being connectable to a power source, in particular a DC power source.

Figure 2:
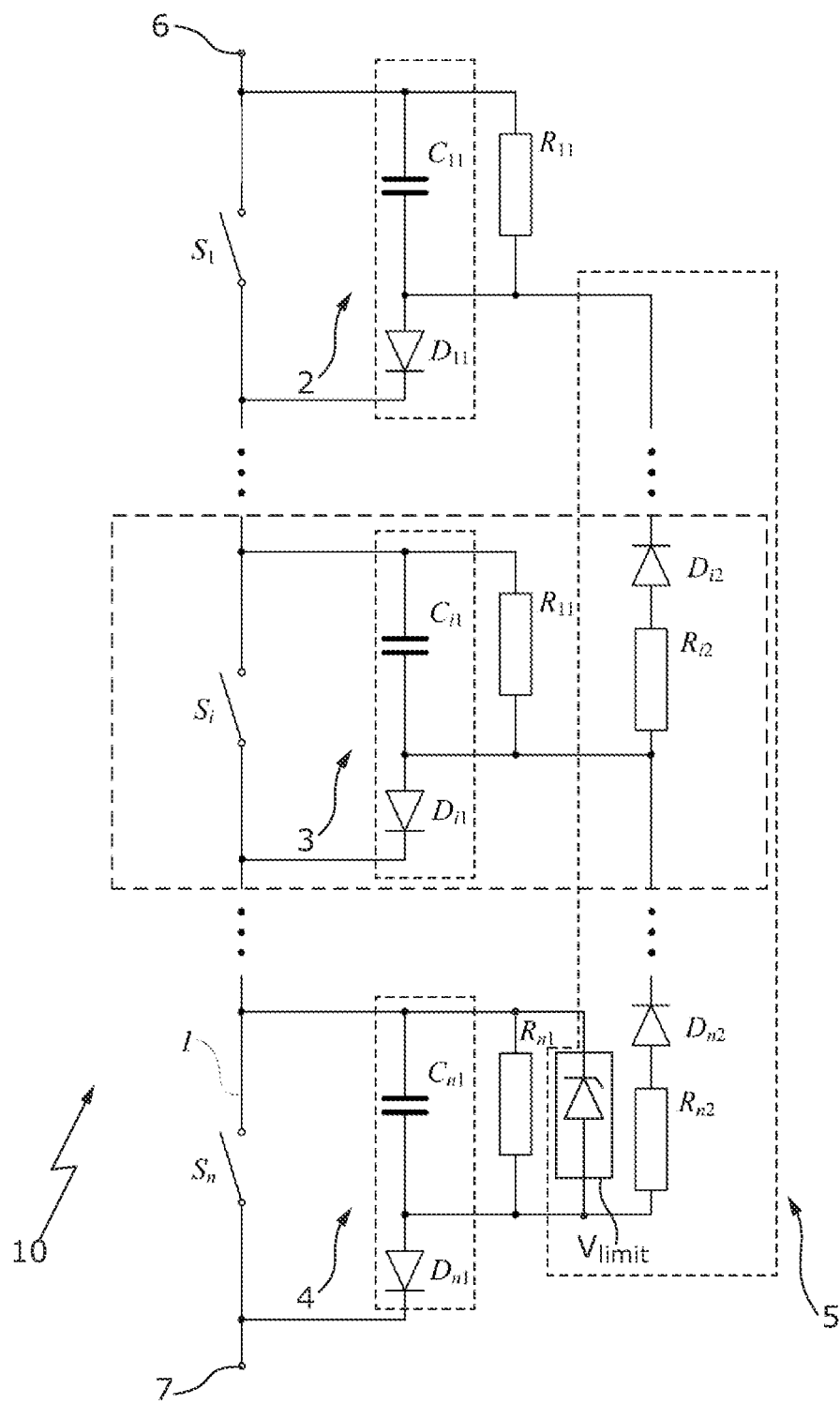
FIG. 2 shows a second embodiment of a HV switch unit transporting charge in a second direction.

The HV switch unit 10 shown in FIG. 2 corresponds to the HV switch unit 1 of FIG. 1 except that the order of the components of the series circuits 2, 3, 4 is reversed and the voltage limiting electronic component Vlimit is at the other end of the voltage balancing circuit 5. In particular the voltage limiting electronic component is connected parallel to snubber energy storage component Cn1 and resistor Rn1.

In the embodiment shown in FIG. 2 the charge is transferred from snubber energy storage component C11 to snubber energy storage component Ci1 and from snubber energy storage component Ci1 to snubber energy storage component Cn1.

Figure 3:
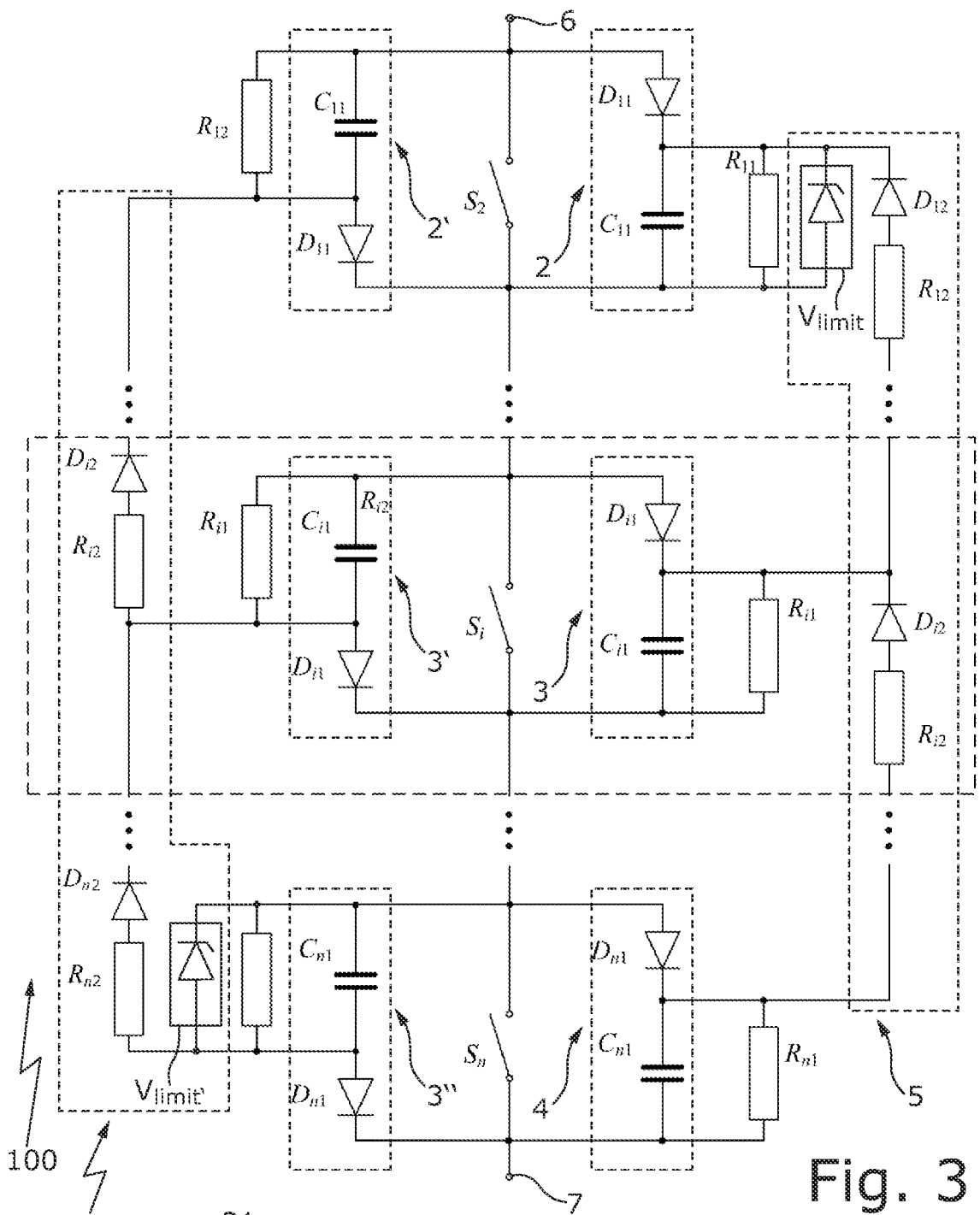
FIG. 3 shows a third embodiment of a HV switch unit transporting charge in two directions.

FIG. 3 is a combination of the embodiments shown in FIG. 1 and FIG. 2. The HV switch unit 100 shown in FIG. 3 comprises a first and a second voltage balancing circuit 5, 5' and a first and second series circuit 2, 3, 4, 2', 3', 4' is provided for each switch S1, Si, Sn.

In voltage balancing circuit 5 charge is transferred upwards to snubber energy storage component C21 and excess energy is consumed in voltage limiting component Vlimit. In voltage balancing circuit 5' charge is transferred to snubber energy storage component Cn1, i.e. downwards and excess energy is consumed in voltage limiting component Vlimit'.

Figure 4:
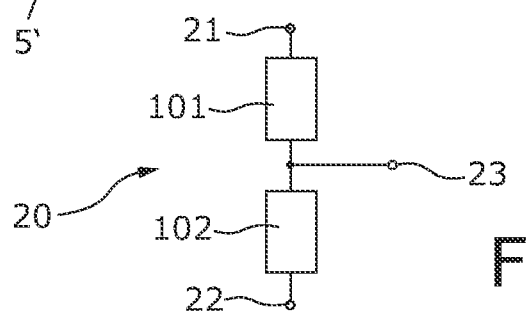
FIG. 4 shows a pulsing assembly according to some embodiments.

FIG. 4 shows a pulsing assembly 20 having a series connection of two HV switch units 101, 102. Each of the HV switch units 101, 102 can be embodied as one of the HV switch units 1, 10, 100.

The pulsing assembly has ports 21, 22 for connection to a power source, in particular a DC power source. An output port 23 is connected to a connection point of the HV switch units 101, 102. A pulsed voltage can be output at port 23 and supplied to a load, for example a plasma load.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A high voltage (HV) switch unit comprising:
a plurality of semiconductor switches connected with each other in series and configured to switch on and off simultaneously,
a plurality of series circuits, each series circuit including a snubber energy storage component and a snubber rectifying component, wherein each series circuit is connected parallel to each respective semiconductor switch,
a voltage balancing circuit comprising a plurality of balancing electronic components in combination with a voltage limiting electronic component, wherein:
  each balancing electronic component is connected between a connection point of the snubber energy storage component and the snubber rectifying component of a respective series circuit associated with a corresponding semiconductor switch,
  the plurality of balancing electronic components forms a chain parallel to the serially connected semiconductor switches, wherein the chain is configured to transport electrical charge from one snubber energy storage component to the next snubber energy storage component only in a first direction, and
  the voltage limiting electronic component is configured to limit a voltage at an end of the chain, where the electrical charge is transported to,
a plurality of second series circuits, each second series circuit including a second snubber energy storage component and a second snubber rectifying component, wherein each second series circuit is connected parallel to each respective semiconductor switch, and a second voltage balancing circuit comprising a plurality of second balancing electronic components in combination with a second voltage limiting electronic component, wherein:
  each second balancing electronic component is connected between a connection point of the second snubber energy storage component and the second snubber rectifying component of a respective second series circuit associated with a corresponding semiconductor switch, and
  the plurality of second balancing electronic components forms a second chain parallel to the serially connected semiconductor switches, wherein the second chain is configured to transport electrical charge from one second snubber energy storage component to the next second snubber energy storage component only in a second direction opposite to the first direction.

2. The HV switch unit according to claim 1, further comprising a resistor connected in parallel to the snubber energy storage component of each series circuit.

3. The HV switch unit according to claim 1, wherein the chain further comprises at least one resistor.

4. The HV switch unit according to claim 1, wherein an input port of the HV switch unit is configured to be connected to a power source.

5. The HV switch unit according to claim 1, wherein the plurality of series circuits associated with the same voltage balancing circuit has a same order of snubber energy storage component and snubber rectifying component.

6. The HV switch unit according to claim 1, further comprising a resistor connected in parallel to the second snubber energy storage component of each second series circuit.

7. The HV switch unit according to claim 1, wherein the snubber energy storage component comprises a capacitor.

8. The HV switch unit according to claim 1, wherein the snubber rectifying component comprises a diode.

9. The HV switch unit according to claim 1, wherein the voltage limiting electronic component comprises a voltage detection component.

10. The HV switch unit according to claim 1, wherein a first semiconductor switch or a last semiconductor switch of the plurality of semiconductor switches is placed on a stable potential, and the voltage limiting electronic component is placed in a vicinity of the first semiconductor switch or the last semiconductor switch placed on the stable potential.

11. A pulsing assembly for supplying voltage pulses to a load, the pulsing assembly comprising:
  an input port for connection to a power source,
  an output port for connection to the load,
  a first HV switch unit connected between the input port and the output port, wherein the first HV switch unit comprises:
    a plurality of semiconductor switches connected with each other in series and configured to switch on and off simultaneously,
    a plurality of series circuits, each series circuit including a snubber energy storage component and a snubber rectifying component, wherein each series circuit is connected parallel to each respective semiconductor switch, and
    a voltage balancing circuit comprising a plurality of balancing electronic components in combination with a voltage limiting electronic component, wherein:
    each balancing electronic component is connected between a connection point of the snubber energy storage component and the snubber rectifying component of a respective series circuit associated with a corresponding semiconductor switch,
    the plurality of balancing electronic components forms a chain parallel to the serially connected semiconductor switches, wherein the chain is configured to transport electrical charge from one snubber energy storage component to the next snubber energy storage component only in a first direction, and
    the voltage limiting electronic component is configured to limit a voltage at an end of the chain, where the electrical charge is transported to, and
  a second HV switch unit connected between the output port and a common port, the common port being configured to be connected to ground.

12. The pulsing assembly according to claim 11, wherein the pulsing assembly is configured to supply pulses with a voltage corresponding to a DC-voltage at the input port.

13. The pulsing assembly according to claim 11, wherein the pulsing assembly is configured to supply pulses with a pulse duration of 1 ms or less.

14. A method of avoiding voltage imbalances in an HV switch comprising a plurality of semiconductor switches connected in series with each other when the HV switch is turned on, the method comprising:
  connecting in parallel to each semiconductor switch a series circuit, the series circuit comprising a snubber energy storage component and a snubber rectifying component,
  spreading excess charge from the snubber energy storage components by providing a chain of balancing electronic components parallel to the semiconductor switches,
  limiting the voltage at a beginning or an end of the chain by providing a voltage limiting electronic component in parallel to the snubber energy storage component associated with a first semiconductor switch or a last semiconductor switch of the plurality of semiconductor switches connected in series,
  connecting in parallel to each semiconductor switch a second series circuit, the second series circuit comprising a second snubber energy storage component and a second snubber rectifying component,
  spreading excess charge from the second snubber energy storage components by providing a second chain of second balancing electronic components parallel to the semiconductor switches, and
  limiting a second voltage at a beginning or an end of the second chain by providing a second voltage limiting electronic component in parallel to the second snubber energy storage component associated with the first semiconductor switch or the last semiconductor switch of the plurality of semiconductor switches connected in series.

* * * * *